Sept. 20, 1966
M. A. HANLEY
3,273,205
CASTING DEVICE INCLUDING A FLASH CAVITY DEFINED
IN PART BY A GASKET ELEMENT
Filed Oct. 18, 1962
FIG. 2
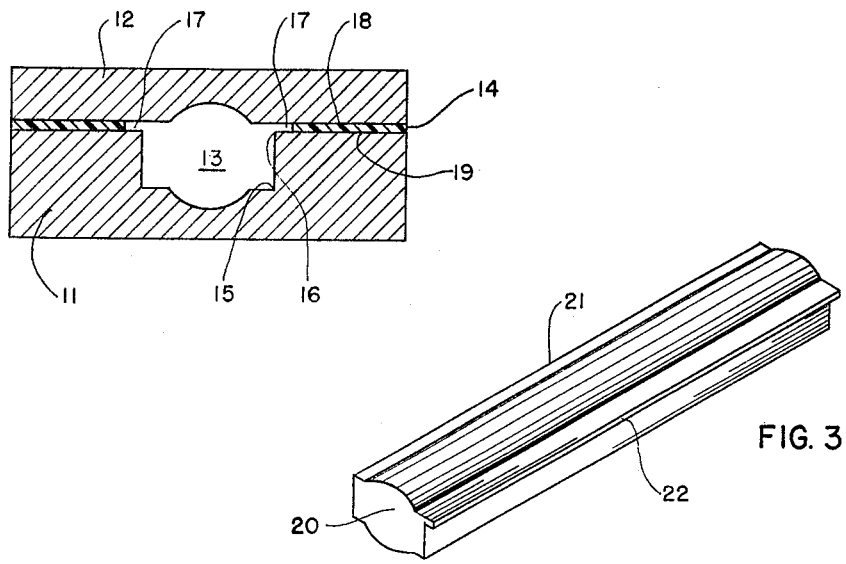
FIG. 3
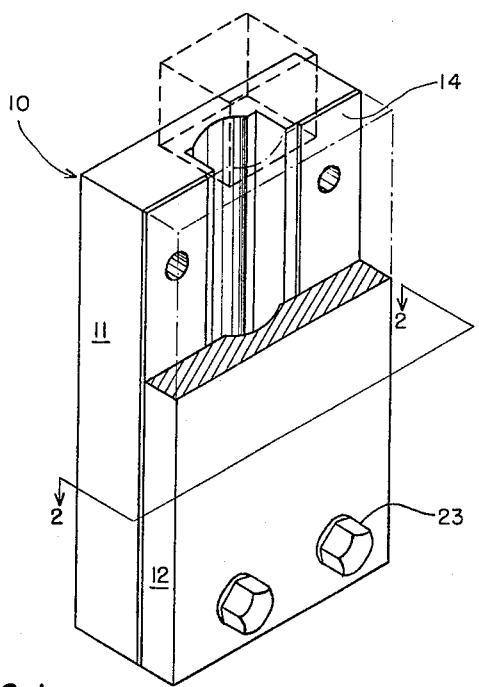
FIG. 1
INVENTOR
MICHAEL A. HANLEY
BY Richard O. Church
ATTORNEY

United States Patent Office 3,273,205
Patented Sept. 20, 1966

3,273,205
CASTING DEVICE INCLUDING A FLASH CAVITY DEFINED IN PART BY A GASKET ELEMENT
Michael A. Hanley, Shillington, Pa., assignor, by mesne assignments, to The Polymer Corporation, a corporation of Pennsylvania
Filed Oct. 18, 1962, Ser. No. 231,515
8 Claims. (Cl. 18—39)

This invention relates to an apparatus for making shaped polyamide articles. More particularly, the invention is concerned with an apparatus for making a shaped polyamide article utilizing low temperature polymerization of higher monomeric lactams in which the article to be produced is deliberately provided with a flash section along at least one of its longer edges whereby articles free from bubbles and large voids are produced.

As used herein, "low temperature" polymerization refers to polymerization processes that can, if desired, be carried out above the melting point of the monomer, but below the melting point of the polymer. In this type of polymerization articles can be cast simultaneously with the polymerization.

The lower temperature anionic polymerization of lactams referred to above is disclosed, for example, in U.S. Patents 3,015,652; 3,017,391; 3,017,392 and 3,018,273.

Briefly, the above patents disclosed the novel polymerization of higher lactams, i.e., lactams containing at least 6 carbon atoms in the lactam ring, as for example, e-caprolactam, enantholactam, caprylolactam, decanolactam, undecanolactam, dodecanolactam, pentdecanolactam, hexadecanolactam, methylcyclohexanone isoximes, cyclic hexamethylene adipamide, and the like, and mixtures thereof; in the presence of an anionic polymerization catalyst, as for example, alkali and alkaline earth metals such as lithium, sodium, potassium, magnesium, calcium, stronthium, etc., either in metallic form or in the form of hydrides, borohydrides, oxides, hydoxides, carbonates, etc., organo-metallic derivatives of the foregoing metals, as well as other metals, such as butyl lithium, ethyl potassium, propyl sodium, phenyl sodium, triphenylmethyl sodium, diphenyl magnesium, diethyl zinc, triisopropyl aluminum, diisobutyl aluminum hydride, sodium amide, magnesium amide, magnesium anilide, Grignard reagent compounds, such as ethyl magnesium chloride, methyl magnesium bromide, phenyl magnesium bromide, and the like; and a promoter compound such as organic isocyanates, ketenes, acid chlorides, acid anhydrides, and N-substituted imide having the structural formula $$A-N-B$$
$$\phantom{A-}R$$

wherein A is an acyl radical such as carbonyl, thiocarbonyl, sulfonyl, phosphinyl and thiophosphinyl radicals, B is an acyl radical of the group A and nitroso, R is a radical such as A, hydrocarbyl, and heterocyclic radicals and derivatives thereof, wherein said radicals in turn can contain radicals such as carbonyl, thiocarbonyl, sulfonyl, nitroso, phosphinyl, thiophosphinyl, tert.-amino, acylamido, N - substituted carbamyl, N - substituted carbamido, alkoxy, ether groups and the like, A and B, or A and R, together can form a ring system through a divalent linking group, and any free valence bond of the A and B radicals can be hydrogen or R, excepting A directly linked thereto, and the promoter compound preferably has a molecular weight of less than about 1000.

This polymerization of the higher lactams is initiated at temperatures of from about the melting point of the lactam monomer to about 250° C., and preferably from about 125° to about 200° C. As the reaction is exothermic, the initiation temperature will be exceeded under most conditions. The amount of catalyst and promoter compound each can vary from about 0.01 to about 20 mole percent, preferably from about 0.05 to about 5 mole percent, and more preferably still from about 0.1 to about 1 mole percent, all based on the higher lactam being polymerized. The higher lactams preferably contain from 6 to 20 carbon atoms and more preferably contain from 6 to 12 carbon atoms. The anionic catalyst preferably is a Grignard compound or an alkali metal and hydrides thereof. It will be understood that the anionic catalyst can be reacted in stoichiometric amount with a higher lactam to form a salt thereof, such as sodium caprolactam, and said salt can than be employed in the polymerization process in an equivalent amount to the anionic catalyst as set out herein above. This preliminary preparation is particularly desirable as it permits ready removal of hydrogen gas from the system as when sodium or sodium hydride is employed, removal of water as when sodium hydroxide is employed, removal of water and carbon dioxide as when sodium carbonate is employed, etc. Isocyanates and N-substituted imides are the preferred promoter compounds. It will be understood that the use of acid chlorides effects the presence of HCl in the system which preferably is removed therefrom to preclude reaction with the anionic catalyst, whereby extra catalyst would otherwise be required. Similarly acid anhydrides generate organic acids in the system which then require sufficient anionic catalyst to neutralize the organic acid in addition to the amount desired to function in the polymerization reactions.

In the manufacture of cast, polylactam articles, particularly articles having a large length to width ratio, difficulties are encountered due to large voids and bubbles which may occur along one or more of the edges of the article, particularly one or more of the longer edges adjacent or corresponding to the parting edges of the mold. Many different types of gasketing or sealing elements have been used, but still large voids and bubbles have more than occasionally been produced. A novel mold means and method have now been found which overcomes these ond other difficulties.

It is an object of this invention to provide novel means for producing shaped polyamide articles which are free from large voids and bubbles along the edges thereof.

Another object of the present invention is to provide means for casting and polymerizing shaped polyamide articles having a removable flash section in which flash section any voids or bubbles which form are concentrated rather than in the main article portion itself.

Various other objects will be apparent from the following description.

In producing articles according to the present invention, a split or multipart mold of suitable contour is selected which is capable of being closed but in which provision is made for the escape of air or other gases. This may be done by means of vent holes, or the air may simply escape through the pouring spout if the article is not too complex in shape. The open mold is pre-heated to about 350° F., although temperatures in the range of 300° to about 400° F., may also be used, and a castable polymerizable mix comprising a higher lactam monomer, a promoter compound, and a catalyst, is prepared. The mix is heated to an initiation temperature which typically is in the range of about 130° C. to 190° C. and then poured into the mold. Upon polymerization, the article shrinks away from the mold surface, sometimes quite rapidly in localized areas.

A flexible gasketing element is employed between the parting surfaces of the mold, but contrary to prior practice in which the gasketing element is disposed over the entire parting surface of the mold, the gasketing element as used in the present invention is recessed or cut back somewhat from the mold cavity to provide, what is hereinafter termed, a flash cavity or flash area. In this flash cavity, which desirably is rectangular in configuration, a relatively thin flash portion forms from the polymerizable material along one or more of the edges of the article.

In the drawings:

FIG. 1 is a perspective partially cut away view of the mold.

FIG. 2 is a cross sectional view of the mold taken along the lines 2—2 of FIG. 1.

FIG. 3 is an isometric view of the article showing the removable flash section.

With further reference to the drawings mold 10 is comprised of separable left hand mold part 11 and separable right hand mold part 12 which, in assembled position are held together by bolts or screws 23. These separable mold parts define mold cavity 13. Gasket 14 is preferably made of a thin flexible material, for example, polytetrafluoroethylene (Teflon), silicone rubber or metal; thickness of the gasket varies from about 5 to 50 mils. The gasket 14 is cut back or recessed from edge 16 and with parting surface 19 of the left hand mold part and parting surface 18 of the right hand mold part defines flash cavity 17. Element 16 indicates a top edge and element 15 a bottom edge of the mold cavity.

Also shown in FIG. 1 (but not numbered), in dotted lines, is a pouring guide or spout which may be uncapped when the pouring, casting and polymerization are performed with the mold vertically disposed, or which may be capped if the operations are carried out with the mold horizontally disposed. Conventional vent holes which may be incorporated in the device are not shown.

In FIG. 3, article 20 is shown with the flash section removed from edge 21 and with flash section 22 still on the article.

In a specific use of the present invention, about $\frac{1}{200}$ mole of a tolylene diisocyanate promoter compound was added to one mole of molten epsilon caprolactam and the mixture raised to about 160° C. Sodium hydride catalyst in the proportion of $\frac{1}{400}$ mole per one mole of epsilon caprolactam was then added and sufficient quantity of the resultant mixture thereafter poured into a preheated, vertically disposed wire guide block mold of the type shown in FIGS. 1 and 2 to fill both the mold cavity and the flash cavity. A Teflon gasket was used. After removal of the article from the mold and cooling thereof, the thin flash section which contained some voids and bubbles was cut away. The resultant article had no voids in it and the long edges were substantially perfect in all respects, particularly the edges corresponding to the parting lines of the mold.

Although it is not known exactly why a gasket of the type used in the present invention is successful in preventing voids or bubbles at or along the edges of an article corresponding to the parting lines of a multi-part mold, the fact remains that it does work and that in a similar mold construction, except where the gasket was disposed over the entire parting surfaces of the mold, and the mold parts tightly secured together, voids and/or bubbles were formed along said edges of the article. As a result of the present invention, it is no longer necessary to machine a flash cavity in the mold or mold surfaces. This effects a considerable saving in the cost of production of molds and molds having flat parting surfaces may now be used.

As a possible explanation of why the construction of the present invention is successful, it first of all can be appreciated that in molds having two or more parting surfaces, the surfaces do not match perfectly in every portion or area; thus, even with a conventional gasket, it is possible for air to get into the mold upon polymerization and shrinkage of the main article portion because of a vacuum caused thereby. If air or other fluid gets through the gasket, it can cause localized cooling slowing down polymerization in such localized areas with the result that the article will shrink away from these temporarily weakened localized areas thus causing large shrinkage voids; or it may simply be that any air entering the mold through the parting surfaces thereof directly causes voids or bubbles. The flash cavity of the present invention may provide an area where material is the last to polymerize and shrink and thus effect a liquid seal during the polymerization and shrinkage of the main article portion.

As will be apparent to those skilled in the art, many modifications, changes and alterations are possible without departing from the spirit and scope of this invention.

I claim:

1. In a device for casting plastic material comprising a mold having at least two separable parts, the improvement which comprises a gasket element positioned between the parting surfaces of said separable mold parts so as to define a flash cavity contiguous with the mold cavity defined by the separable mold parts.

2. In a device for casting a polymerizable material comprising a mold having at least two separable parts, the improvement which comprises a gasket element positioned and arranged between the parting surfaces of said separable mold parts so as to define a flash cavity contiguous with the mold cavity defined by the separable mold parts.

3. In a device for casting a higher monomeric lactam polymerizable material comprising a mold having at least two separable parts, the improvement which comprises a gasket element positioned and arranged between the parting surfaces of said separable mold parts so as to define a flash cavity contiguous with the mold cavity defined by the separable mold parts.

4. Device of claim 2 in which the flash cavity is of uniform thickness.

5. Device of claim 3 in which the flash cavity is adapted to receive and maintain in at least partially liquid condition a portion of the polymerizable material during the casting and polymerization of the material in the mold cavity.

6. A mold for casting plastic material which comprises at least two separable mold parts, said mold parts defining a molding cavity, a gasket element inserted between the parting surfaces of said separable mold parts, said gasket being recessed from the top edge of the molding cavity to define a flash cavity which is contiguous with the molding cavity.

7. Molding device of claim 6 in which the flash cavity is substantially rectangular in cross section.

8. Molding device of claim 6 in which the gasket is comprised of polytetrafluoroethylene.

References Cited by the Examiner

UNITED STATES PATENTS

| 2,500,598 | 3/1950 | Axelrod | 264—313 XR |
|---|---|---|---|
| 2,730,766 | 1/1956 | Tompkins. | |
| 2,734,227 | 2/1956 | Costick et al. | 18—39 |
| 2,867,003 | 1/1959 | Stiles | 18—39 |
| 2,976,573 | 3/1961 | Davis | 264—275 |
| 3,056,168 | 10/1962 | Terry | 18—39 |
| 3,151,360 | 10/1964 | Jurgeleit. | |

FOREIGN PATENTS 201,607   4/1956   Australia.

ROBERT F. WHITE, *Primary Examiner.*

ALEXANDER H. BRODMERKEL, *Examiner.*

J. R. DUNCAN, S. A. HELLER, *Assistant Examiners.*